(12) United States Patent
Leonhard

(10) Patent No.: US 7,844,450 B2
(45) Date of Patent: Nov. 30, 2010

(54) METHOD FOR ANALYSING SIGNALS CONTAINING PULSES

(76) Inventor: Frank Uldall Leonhard, Louisevej 13, DK-2800 Lyngby (DK)

( * ) Notice: Subject to any disclaimer, the term of this patent is extended or adjusted under 35 U.S.C. 154(b) by 964 days.

(21) Appl. No.: 10/567,118

(22) PCT Filed: Aug. 6, 2004

(86) PCT No.: PCT/DK2004/000526

§ 371 (c)(1),
(2), (4) Date: Dec. 13, 2006

(87) PCT Pub. No.: WO2005/015543

PCT Pub. Date: Feb. 17, 2005

(65) Prior Publication Data

US 2007/0156409 A1    Jul. 5, 2007

(30) Foreign Application Priority Data

Aug. 6, 2003 (DK) .......................... PA 2003 01136

(51) Int. Cl.
*G10L 21/00* (2006.01)
(52) U.S. Cl. .................. 704/200; 704/225; 704/223
(58) Field of Classification Search .............. 704/200, 704/225, 223
See application file for complete search history.

(56) References Cited

U.S. PATENT DOCUMENTS

| 2,918,667 | A | * | 12/1959 | Olson et al. | 340/658 |
| 2,971,058 | A | * | 2/1961 | Olson et al. | 178/31 |
| 3,204,030 | A | * | 8/1965 | Olson et al. | 704/243 |
| 3,737,666 | A | * | 6/1973 | Dutro | 377/8 |
| 4,783,807 | A | * | 11/1988 | Marley | 704/235 |
| 4,802,225 | A | | 1/1989 | Patterson | |
| 5,422,977 | A | | 6/1995 | Patterson et al. | |

FOREIGN PATENT DOCUMENTS

| WO | WO-99/48085 A | 9/1999 |
| WO | WO-02/25997 A | 3/2002 |

* cited by examiner

*Primary Examiner*—Daniel D Abebe
(74) *Attorney, Agent, or Firm*—Birch, Stewart, Kolasch & Birch, LLP

(57) ABSTRACT

The invention provides a method for analysing an input signal having an input frequency bandwidth. The method comprises providing at least one frequency-bandwidth limited portion of the input signal. For each frequency-bandwidth limited portion of the input signal the durations of half-periods and signal excursions during respective half-periods are determined. Based on the signal excursions and corresponding half-periods a quality of the input signal is determined. The determined signal quality can be a vowel in a 10 speech signal or a quality related to a condition of an industrial product. The method provides speaker independent vowel recognition, and even whispered vowels can be recognised.

8 Claims, 7 Drawing Sheets

METHOD FOR ANALYSING SIGNALS CONTAINING PULSES

FIELD OF THE INVENTION

The invention relates to the analysis of pulse signals such as speech signals, physiological signals in a human or animal body such as nerve signals and signals in industrial products, with the purpose of determining a quality of the signals, such as recognising vowels in speech signals.

BACKGROUND OF THE INVENTION

For decades the fundamental basis for assessing auditory perception has been assumed to be short time Fourier transformation. This has been the case because the construction of the cochlea point in that direction. This assumption has however caused several unexplainable phenomena. Among them it has never been revealed how the human hearing perceives vowels, and how it in general perceives sound "pictures".

The ear originally evolved as a warning system that should warn against enemies that try sneaking toward you, and it is typical sound from breaking twigs that gives you such a warning. Such a sound is a pulse and it might have a very short duration, which is not suitable for analysis by Fourier transformation because the information contained by the pulse will be averaged through the analysis. Also the frequency spectrum of a signal has the weakness that outstanding frequencies in the spectrum might come from different sources without the possibility to tell. This is a big problem by analysing vowels in speech recognition, where background noise might be interpreted as false formants.

Fourier transformation is a mathematical tool that eliminates the time dimension and is therefore by nature not suitable for pulse analysis. Because pulses are very important, the dynamic behaviour of the signal is very important, and the method for analysis must be based on tools that reflect the physical behaviour of the cochlea. The invention provides a time and frequency analysis that simulates the behaviour of human ear.

The method of the invention is developed for speech analysis, but the method is suited for other purposes as well. Thus, the results of the method of the invention may be used for identification of sound or vibration or speech or quality measurement of products where sound or vibration reveals the quality of the products. The method of the present invention may also be used in connection with speech recognition or speech coding and decoding in narrowband telecommunication. In its broadest aspect the result of the invention may be used for identification or representing features, which a human or animal ear can perceive, but it is not restricted thereto.

Oscillation analysis is a general analysis that also may be used outside the frequency range that can be perceived by a human or animal ear such as high frequency telecommunication.

SUMMARY OF THE INVENTION

The invention provides a method for analysing an input signal having an input frequency bandwidth. The method comprises providing at least one frequency-bandwidth limited portion of the input signal. For each frequency-bandwidth limited portion of the input signal the durations of a predetermined number of half-periods and signal excursions during respective half-periods are determined. Based on the signal excursions and corresponding half-periods a quality of the input signal is determined. The signal excursions can be determined as peak-to-peak values or as signal excursion between two consecutive zeroes of the full-wave or half-wave rectified frequency-bandwidth limited portion of the input signal. The determined signal quality can be a vowel in a speech signal, or a physiological signal in a human or animal body such as a nerve signal, or a quality related to a condition of an industrial product. The method provides speaker independent vowel recognition, and even whispered vowels can be recognised.

DETAILED DESCRIPTION OF THE INVENTION

A pulse is typically created by an abrupt force hitting a system. It can be a fault on a gear wheel in a gearbox or other industrial product, and each time the fault on the wheel is meshed a pulse is generated by the force caused by the fault. Or it can be the pressure explosion created by the vocal cords in voiced speech. The force being an abrupt force means that the transient response of the system is very important and it will often also be non-linear.

By a Fourier transform the time domain is eliminated and therefore a Fourier transform is not optimal describing dynamic conditions in signals. A better method is to divide the auditory frequency interval into auditory channels by means of a filter bank of band-pass filters. Band-pass filters having broad frequency bands have a short impulse response and the time resolution will then be correspondingly high.

It has been assumed for many years that the cochlea of the ear is divided into a number of auditory frequency channels where the signal is analysed [Zwicker 1961]. The methods used were however focused on quasi steady state frequency analysis, among others to be able to trace the formants in speech signals. An exception, which is described by F. Leonhard [Leonhard 1993] and [Leonhard 2002], considers abrupt changes in the energy, but a closer relation to how the sound picture is perceived is not described.

Idealized a pulse is an impulse response of a system and contains damped eigenfrequencies, which can be described by poles of the system, and it is in fact a kind of fingerprint of the system. The objective for a pulse analysis is to get as accurate and as much information as possible out of the pulse and it seems to be the case for auditory perception. In the following the focus will be on analysing the "colour" of the sound picture or vowels, which can be considered as special "colours" of the sound.

Figure 1:
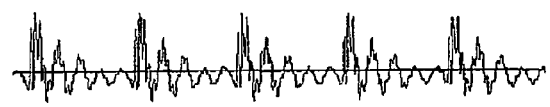
FIG. 1: 50 ms of the vowel "æ:" as in "had" pronounced by a male and a female.
Figure 1:

FIG. 1 shows 50 ms of the vowel "æ:" as in "had" pronounced by a male (the upper signal) and a female (the lower signal). As it is seen the signal contains damped frequencies—most obvious for the male. It is also clear that the interval between the pulses is about twice as long for the male compared to the female.

Figure 2:
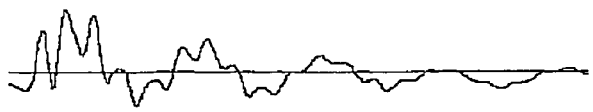
FIG. 2: 10 ms (one pulse) of the vowel "æ:" (male) and output from four auditory channels.
Figure 2:
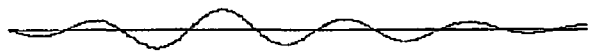
Figure 2:
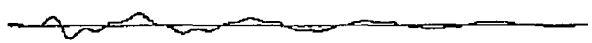
Figure 2:
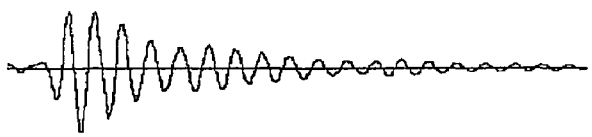
Figure 2:
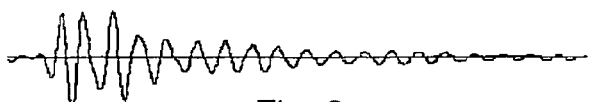

To have a high time resolution the band-pass filters in the auditory channels have to have broad frequency bands. FIG. 2 shows about 10 ms of the vowel "æ:" spoken by a male (one pulse) and the output of four auditory channels. A low channel in the frequency range is op to 600 Hz and a channel in the range 600-1400 Hz, a channel in frequency range is from 1400-2800 Hz, and a channel from 2000-4000 Hz. This vowel is primarily presented in the third channel.

Figure 3:
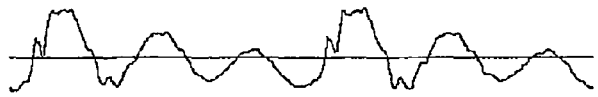
FIG. 3: 10 ms (two pulses) of the vowel "æ:" (female) and the output from four auditory channels.
Figure 3:
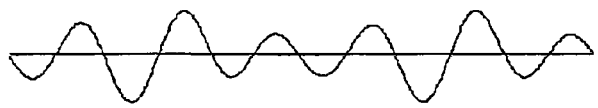
Figure 3:
Figure 3:
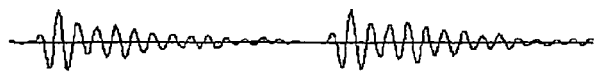
Figure 3:

FIG. 3 shows about 10 ms (two pulses) of the vowel "æ:" pronounced by a female, and the output from the four auditory channels. Compared to the vowel spoken by the male the period between the pulses is only the half—about 5 ms for the female and 10 ms for the male. However the period of the oscillations in the mid channels is very similar. In other words the oscillation is independent of the pitch period. The gain in the four channels is compensated for the higher sensitivity of the ear in the higher frequency range. If there are oscillations in the low channel it gives a better volume in the sound picture.

On that background there are three phenomena that are of interest by the pulses. One is the nature of the oscillation; period and magnitude. The time period of the oscillations seems to be very important for the sound picture. The second is the progress of the instantaneous energy through the duration of the pulse. The third is the period of the pulses. Is the period constant through a longer period or is it random. It would be very tempting to make a frequency analysis by means of Fourier transform to analyse the oscillations, but they are often composed of more than one frequency, which affects their time period. Therefore a better method would be to measure the time period of the oscillations in an oscillation analysis.

Figure 4:
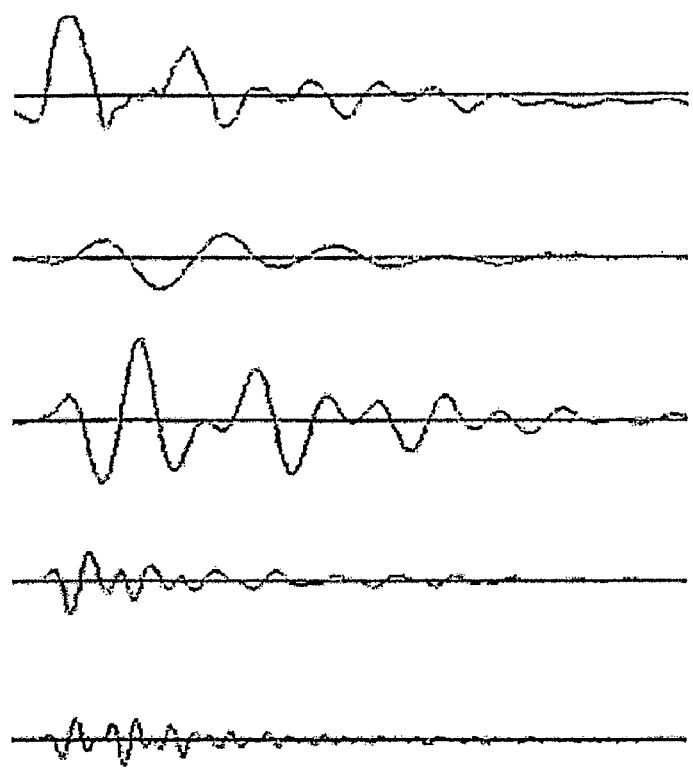
FIG. 4: About 10 ms (two pulses) of the vowel "a:" (male) and the output from four auditory channels.

FIG. 4 shows the speech and the output of the four channels of about 10 ms of the vowel "a:" as in "hod" spoken by a male. The vowel is represented by the oscillations in the second channel.

Figure 5:
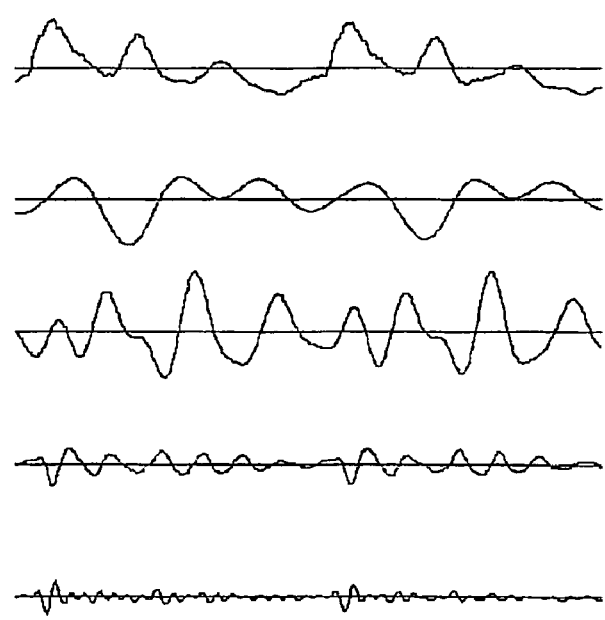
FIG. 5: About 10 ms (two pulses) of the vowel "a:" (female) and the output from four auditory channels.

FIG. 5 shows the vowel "a." pronounced by a female. Also here it is seen that the pitch of the female voice is about twice of the male voice but the dominant period of the oscillations in the second channel is the same.

By identification of vowels the oscillations in the channels are most important, especially in the three upper channels. As it appears from FIG. 2 the output from the channels is rather periodic. This could lead to the assumption that oscillation only consists of one frequency. But the band-pass filters are very broad banded (typically one or two octaves) and the pulse is a transient response. This means that the oscillation often is formed by more than one frequency. By vowels it is typically the second formant that dominates but it is influence by other frequencies.

During a time frame the oscillations are measured directly from the top to the bottom and from the bottom to the top, i.e. half-periods or a predetermined number of half-periods are measured. In both cases the peak-to-peak values are measured and sorted after the period between the top/bottom and the bottom/top either continuously or discretely, i.e. in a number of finite intervals also referred to as "bins", and accumulated numerically.

Another method is to make a rectification (e.g. full-wave or half-wave rectification) of the band-pass filtered signals and measure the period between the tops, which is the half-period of the un-rectified signal.

To illustrate the importance of the channels the oscillations of three vowels that are identified in different channels are analysed. To illustrate that oscillation analysis is independent of the speaker vowels spoken by a randomly selected male and female are analysed. The vowels are "i:" as in "heed", "a:" as in "hod" and "u:" as in "who'd".

The low channel has a total time interval from 1 to 2 ms and the other channel has an interval from 0.16 to 1.2 ms. All channels are divided into 20 time bins and the scale of the bins is logarithmic. In a time frame of 30 ms the half-periods of the oscillations are sorted after the duration and the peak-peak value is accumulated in the corresponding bin.

Figure 6:
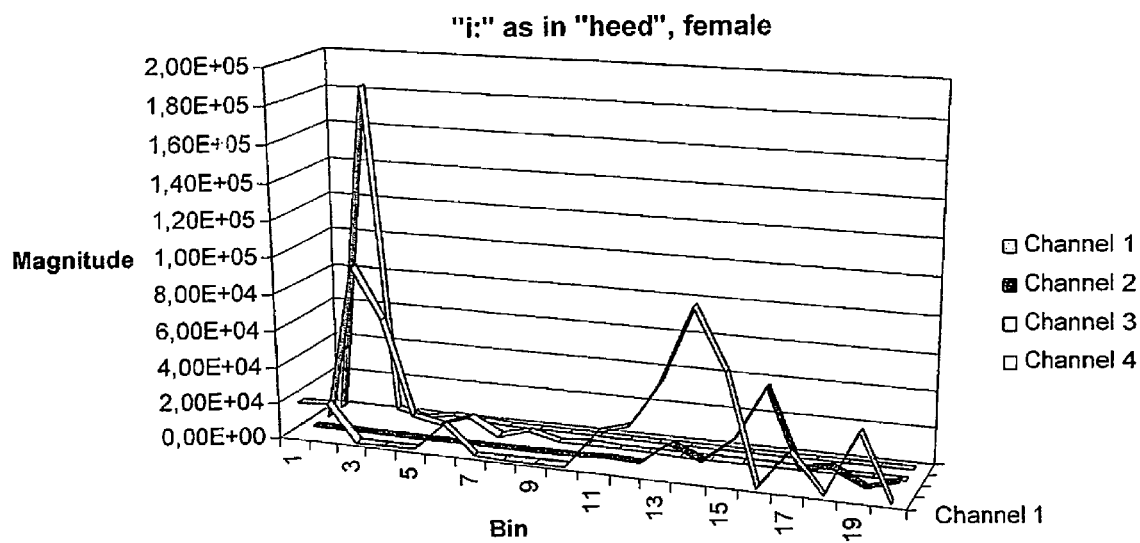
FIG. 6: Analysis of oscillations of the vowel "i:" spoken by a female.
Figure 7:
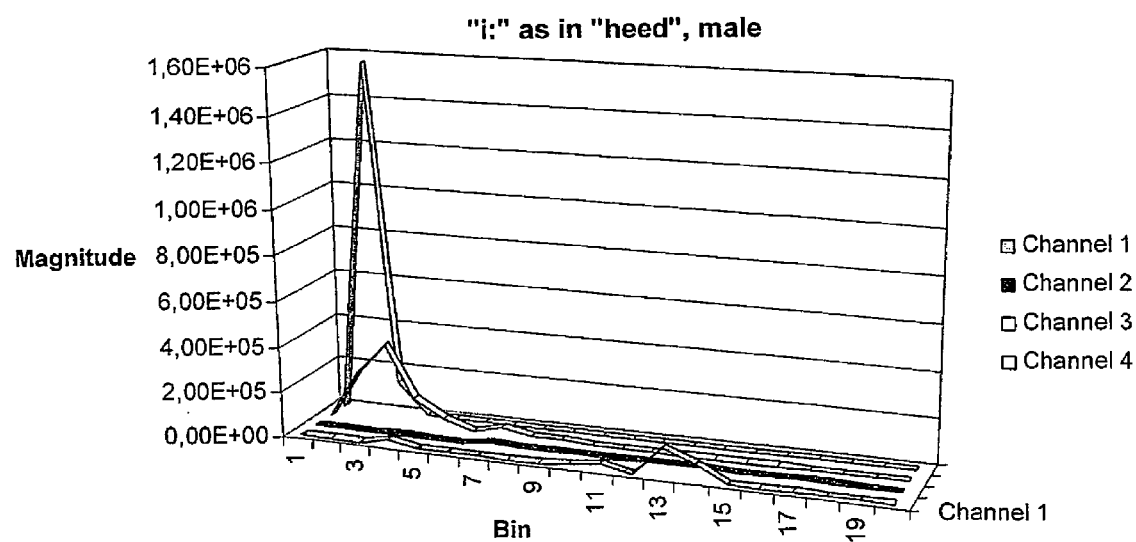
FIG. 7: Analysis of oscillations of the vowel "i:" spoken by a male.

FIGS. 6 to 11 show graphs of the results. FIGS. 6 and 7 show the vowel "i:" and both the female and male have outstanding reflections at bin 2 in the high channel, which correspond to time interval from 0.17 to 0.19 ms. It is the half period of the oscillations. The oscillation period is then in the interval from 0.34 to 38 ms and independent of the pitch. The female voice has also a reflection at bin 14 and 19 in the low channel. It means the sound picture of the voice has more volume compared to the male.

Figure 8:
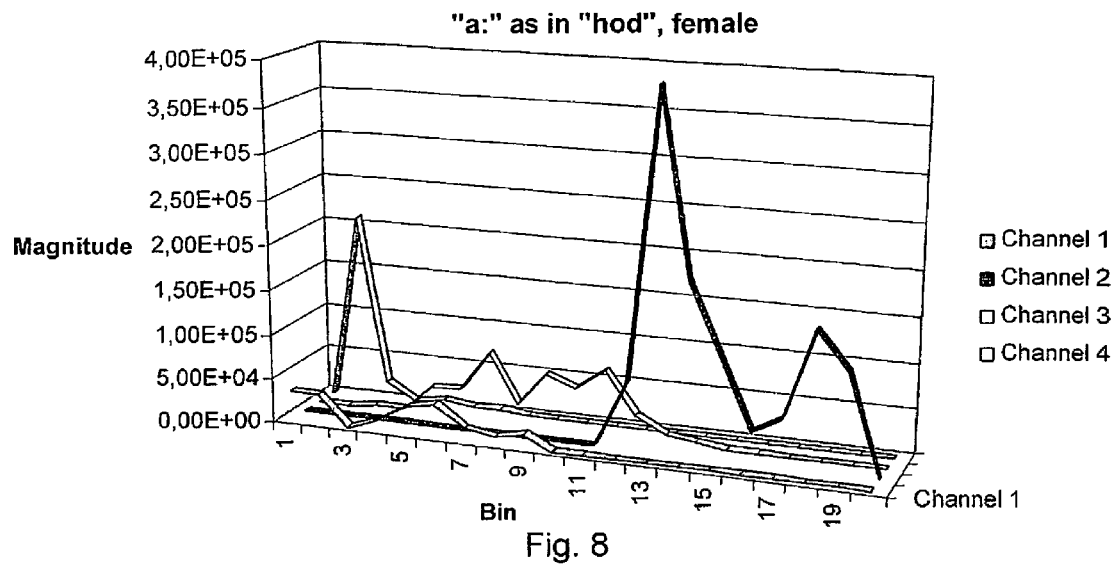
FIG. 8: Analysis of oscillations of the vowel "a:" spoken by a female.
Figure 9:
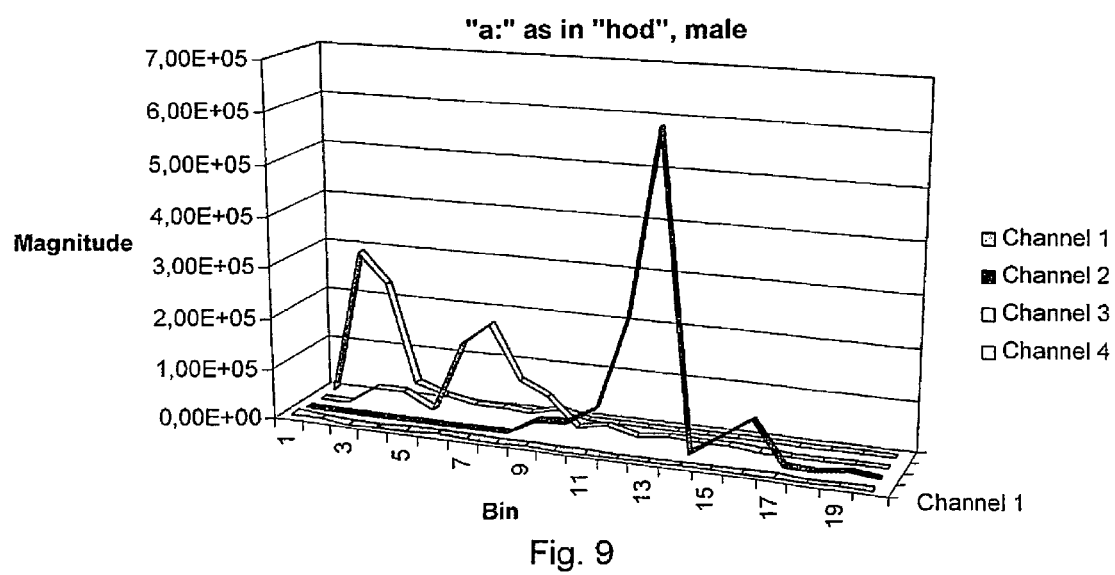
FIG. 9: Analysis of oscillations of the vowel "a:" spoken by a male.

FIGS. 8 and 9 show the result of the vowel "a:" spoken by a female and a male and they have both outstanding reflections at bin 13 in the second channel corresponding to time interval from 0.54 to 0.59 ms and an oscillation period between 1.08 and 1.18 ms.

Figure 10:
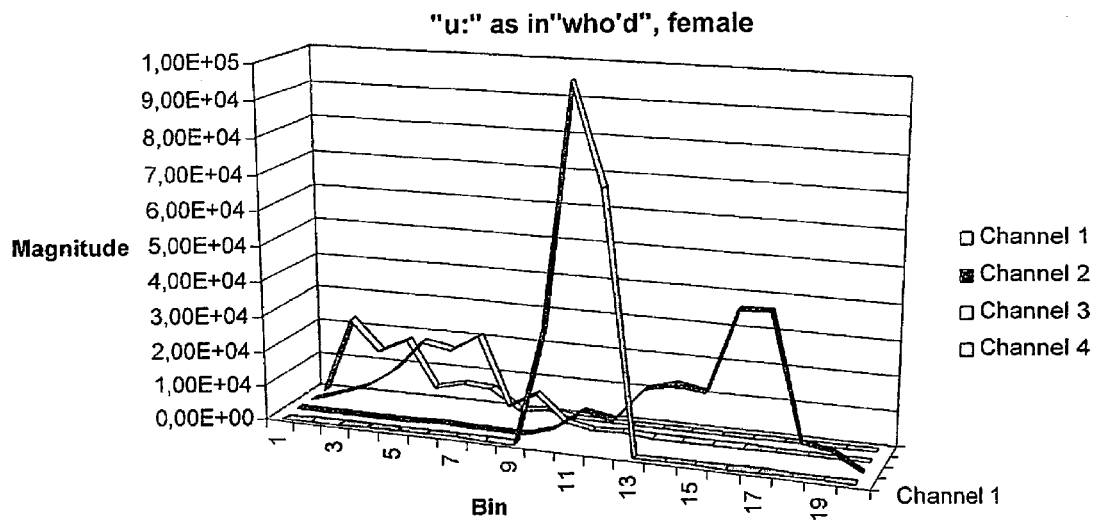
FIG. 10: Analysis of oscillations of the vowel "u:" spoken by a female.
Figure 11:
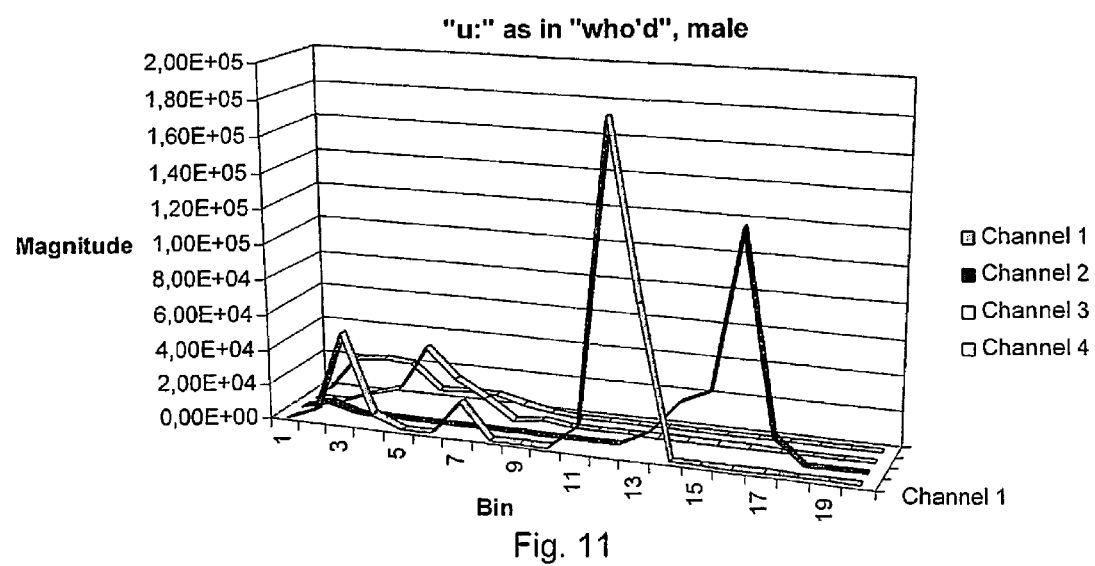
FIG. 11: Analysis of oscillations of the vowel "u:" spoken by a male.

FIGS. 10 and 11 show the result of the vowel "u:" spoken by a female and a male and they have both outstanding reflections in the first channel. The female has the reflection at bin 11 and for the male at bin 12. It corresponds to a period time between 3.4 and 3.9 ms. "u:" is the deepest vowel and in fact oscillations with a period longer than about 2.5 ms sounds like "u:". The reflection in the second channel at bin 16 and 17 corresponding to a period between 1.5 and 1.8 ms might also be very importance for the vowel "u:" especially if it is identified through a phone.

The two voices are very different and the results are so outstanding that it is every probability that this technique will lead to speaker independent speech recognition.

Figure 12:
FIG. 12: 10 ms (one pulse) of the vowel "æ:" (male) added 5 dB white noise.

The principles of APPA are by nature robust against noise because it is based on a time analysis of oscillations. To illustrate it the vowel "æ:" spoken by a male is added 5 dB with noise (WN). Both the clean signal and the noisy signal are analysed. FIG. 12 shows the same speech signal shown on FIG. 2 but added 5 dB white noise.

Figure 13:
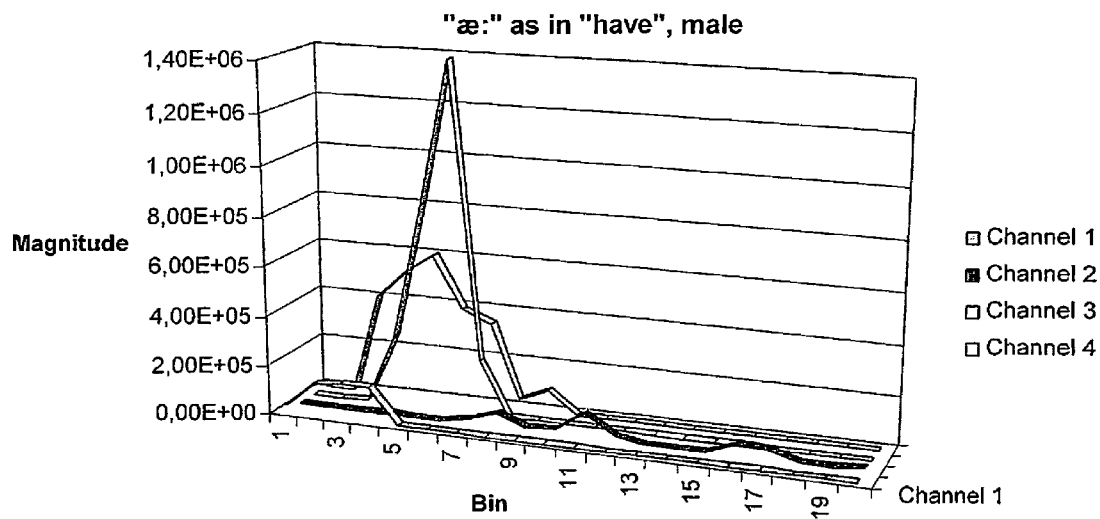
FIG. 13: Analysis of oscillations of the vowel "æ:" without white noise.
Figure 14:
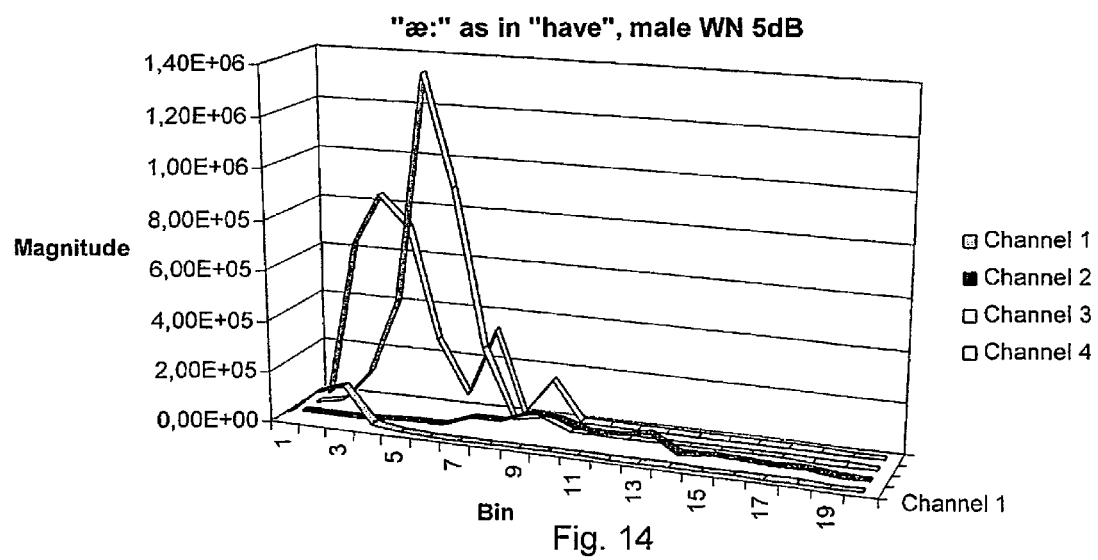
FIG. 14: Analysis of oscillations of the vowel "æ:" added 5 dB white noise.

FIG. 13 shows an oscillation analysis of the clean signal and FIG. 14 shows an analysis of same signal added 5 dB white noise. 5 dB white noise added is very heavy noise and it is trying listing to the signal. As it is seen from FIG. 13 the result have outstanding reflections at bin 6 in the channel 3 corresponding to an oscillation period between 0.53 and 0.59 ms. On FIG. 14 it is seen that the 5 dB white noise added moves the reflection to bin 5 corresponding to a period between 0.48 and 0.53 ms It might be because the periods are on the boarder between the two bins. The reflection is still outstanding for the noise signal.

Figure 15:
FIG. 15: 10 ms of the vowel "æ:" (male) whispered.

It seems that APPA also is able to identify vowels even if they are whispered. FIG. 15 shows the vowel "æ:" whisper by a male. Two different persons pronounce the voiced and the whispered vowel.

Figure 16:
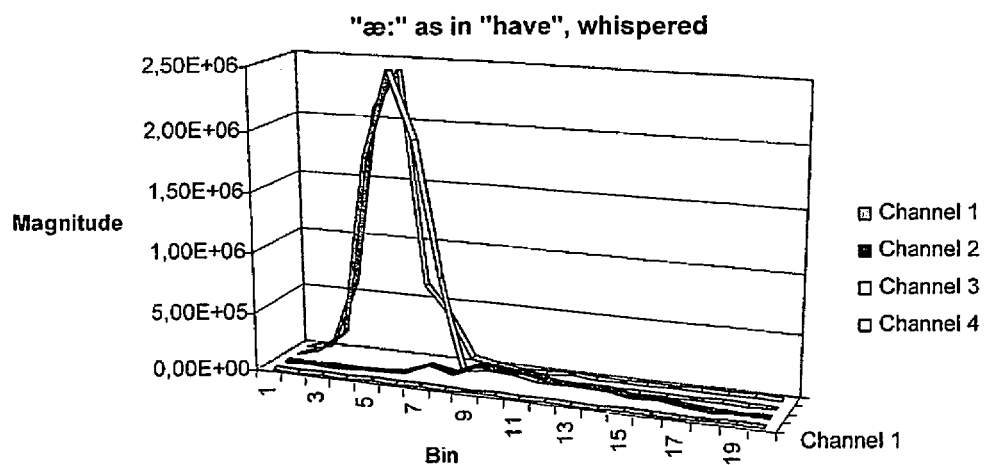
FIG. 16: Analysis of oscillations of the vowel "æ:" whispered.

As it is seem from the FIG. 15 there is no pitch because it is whispered. FIG. 16 shows an oscillation analysis, and it has outstanding reflections in bin 5 corresponding to period between 0.48 and 0.56 ms, which very much correspond to the voiced version shown on FIG. 14.

As it is seen from above, oscillations in the signal seems to mean a lot for the auditory perception, especially in the higher auditory channels. Of course all parameters could be used for analysing the sound picture, but for instance in speech recognition it will be advantageous to have less parameters. Therefore a subset of the parameters is suggested.

The maximum magnitude of the accumulated peak-peak values of the oscillations and the bin where it occurs is very important.

Instead of using the bin where the magnitude has the maximum as feature it might be an advantage to use the central point for all the magnitudes of each channel instead. Preferably, therefore, the method of the invention calculates this feature.

The invention is based on the assumption that the cochlea is very broadbanded when it is relaxed and it has an adaptive nature if it is actuated by sinusoids and gets more narrow-banded around the frequencies.

Figure 17:
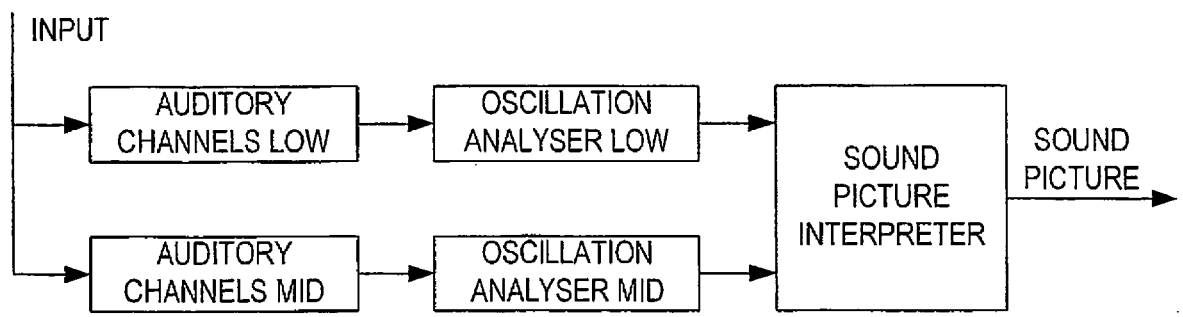
FIG. 17: A block diagram of APPA.

In FIG. 17 the block Auditory Channels Low comprises one or more channels each with a band-pass filter in the low auditory frequency range from 50 Hz up to e.g. 600 Hz. Typically two channels are used, such as 50-200 Hz and 200-600 Hz each covering more than one octave, possibly more than two octaves. In each channel a predetermined number of half-period oscillations, preferably one half-period, are detected, and the corresponding signal excursions or magnitudes, e.g. the half-period peak-to-peak values, are sorted according to their half-period durations. The sorting can be continuous or discrete by means of finite intervals or "bins" with part-intervals of the total interval. Preferably, the sorting is done using a logarithmic time scale. The low auditory frequency range from 50-600 Hz corresponds to half-period oscillations in the time interval 0.7-10 ms.

Correspondingly, the block Auditory Channels Mid comprises one or more channels each with a band-pass filter in the middle auditory frequency range from 600 up to e.g. 4000 Hz. Typically three channels are used, such as 600-1400 Hz, 1400-2800 Hz and 2000-4000 Hz, each covering one octave or more. In each channel a predetermined number of half-period oscillations, preferably one half-period, are detected, and the corresponding signal magnitudes, e.g. the half-period peak-to-peak values, are sorted according to their half-period durations. The sorting can be continuous or discrete by means of "bins" with part-intervals of the total interval. Preferably, the sorting is done using a logarithmic time scale. The middle auditory frequency range from 600-4000 Hz corresponds to half-period oscillations in the time interval from 0.12 to 1.2 ms.

The invention may also have a block Auditory Channels High (not shown), which is a filter bank containing band-pass filters also in the range 4-18 kHz corresponding to half-period oscillations in the time interval from 0.01 to 0.14 ms.

For some applications it may be sufficient to have one band-pass filter with an appropriate frequency-bandwidth.

The outputs from the oscillation analysers are used to interpret the "sound picture", i.e. recognition of vowels in speech.

For other purposes the method may include other frequency ranges that are suited for the purpose.

REFERENCES

[Leonhard 1993] Frank U. Leonhard, "Method and System for Detecting and Generating Transient Conditions in Auditory Signals", EP 0737351, April 1993.

[Zwicker 1961] E. Zwicker, "Subdivision of the audible frequency range into critical bands", Journal of the Acoustical Society of America, 33, page 248-249, 1961.

[Seneff 1988] Stephanie Seneff, "A joint synchrony/mean-rate model of auditory speech processing", Journal of Phonetics (1988) 16, 55-76.

[Thorsen 1978] Nina Thorsen & Oluf Thorsen, "Fonetik for sprogstuderende", Institut for Fonetik, KØbenhavns Universitet, 3. reviderede udgave, 1978.

[Leonhard 2002] Frank Uldall Leonhard, "Quality Control of Electro-acoustic Transducers", WO 0225997, March 2002.

The invention claimed is:

1. A method for analysing an input signal having an input frequency-bandwidth, the method comprising
   providing at least one frequency-bandwidth limited portion of the input signal,
   determining, for each of the at least one frequency-bandwidth limited portion of the input signal, durations of a predetermined number of half-periods and signal magnitudes during respective predetermined number of determined half-periods, and
   determining a distribution of the signal magnitudes as a function of their durations of the predetermined number of half-periods.

2. A method according to claim 1 wherein the signal magnitudes are determined as peak-to-peak values.

3. A method according to claim 1 comprising rectifying each of the at least one frequency-bandwidth limited portion of the input signal, and determining the signal magnitudes as the signal magnitude between two consecutive zeroes.

4. A method according to claim 1 wherein the predetermined number of half-periods is one half-period.

5. A method according to claim 1 wherein the distribution of the signal magnitudes as a function of their durations of the predetermined number of half-periods is used for identifying vowels in a speech signal.

6. A method according to claim 5 wherein the as least one frequency-bandwidth limited portion has a bandwidth of at least one octave.

7. A method according to claim 1 wherein the distribution of the signal magnitudes as a function of their durations of the predetermined number of half-periods is used for identifying a condition of an industrial product.

8. A method according to claim 1 wherein the distribution of the signal magnitudes as a function of their durations of the predetermined number of half-periods is used for identifying a condition of a physiological signal in a human or animal body such as a nerve signal.

* * * * *